(12) United States Patent
Aravamudan et al.

(10) Patent No.: US 6,584,186 B1
(45) Date of Patent: Jun. 24, 2003

(54) PROTECTING COMMUNICATIONS NETWORK INTEGRITY

(75) Inventors: Murali Aravamudan, Murray Hill, NJ (US); Shamim A Naqvi, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/481,951

(22) Filed: Jan. 12, 2000

(51) Int. Cl.[7] .............................................. H04M 3/42
(52) U.S. Cl. ................... 379/201.03; 379/900
(58) Field of Search ................. 379/201.01, 207.02, 379/201.02, 201.03, 900, 901

(56) References Cited

U.S. PATENT DOCUMENTS

| | | | | |
|---|---|---|---|---|
| 5,805,804 A | * | 9/1998 | Laursen et al. ............. 370/397 |
| 5,809,512 A | * | 9/1998 | Kato ........................... 707/502 |
| 5,931,913 A | | 8/1999 | Meriwether et al. ........ 709/227 |
| 6,085,252 A | * | 7/2000 | Zhu et al. .................... 709/231 |
| 6,094,600 A | * | 7/2000 | Sharpe, Jr. et al. ........... 700/19 |

OTHER PUBLICATIONS

"A Primer on the H.323 Series Standard" Databeam Corporation White Paper, (1998).

* cited by examiner

*Primary Examiner*—Creighton Smith
(74) *Attorney, Agent, or Firm*—Donald P. Dinella

(57) ABSTRACT

A method and apparatus for protecting against network damage in next generation communications networks. More particularly, network safety is achieved using semantic restriction of higher level call processing protocol primitives coupled with dynamically programming the various network routing elements to enforce both connection control and rate control.

30 Claims, 4 Drawing Sheets

PROTECTING COMMUNICATIONS NETWORK INTEGRITY

FIELD OF THE INVENTION

The present invention relates to communications networks, and more particularly, to protecting the operational integrity of such networks.

BACKGROUND OF THE INVENTION

A well-known feature of conventional telecommunications systems which provide telephone service, e.g., public switched telephone network (PSTN), central offices (CO), private branch exchange (PBX), and Internet telephony servers, is that such systems are discrete islands of functionality, and each such island has its own particular syntax and semantics. The use of the different syntaxes, semantics, and protocols, makes it difficult to easily interconnect the various islands, and it is virtually impossible to provide features that work together seamlessly across the various islands.

Furthermore, the introduction of new service features, i.e., applications, into conventional telephony networks by the network's operator is accomplished using internal applications programmers and/or a limited number of select (and in most cases, certified) external software vendors. The reason for such careful introduction of new service features through a small number of vendors is directly related to the apprehension of introducing a piece of uncertified software into the network which can cause major service interruptions. There exist numerous examples of well publicized communications network failures which have caused major service interrupts and significant financial losses for their network operators and customer base.

Complicating matters further is the current day evolution of next generation networks which are centered on the convergence of voice and data networks. That is, it appears highly likely that the next generation communications network will be an evolution of today's PSTN and Internet Protocol (IP) networks. Today's service providers are being driven by a number of factors in the development of such next generation networks such as: (1) the well-known Internet is becoming a major network choice for distribution of voice and data; (2) IP usage is increasing at a dramatic rate thereby causing bandwidth problems on existing PSTN networks carrying significant data traffic; (3) convergence of PSTN and packet networks (e.g., IP networks) is required to allow for end-to-end delivery of communications services; (4) the creation of new services connected with the increasing use of packet networks; and (5) increasing deregulation in the marketplace is creating new and competitive telecommunications environments for established, new and specialized service providers in both voice and data traffic.

One major underlying feature in delivering such next generation communications networks is network interoperability. That is, the service provider's ability to offer valued added communications services across circuit and packet networks is tied directly to the ability of providing interoperability across a number of heterogeneous networks that support a wide range of signaling protocols (e.g., SS7, IP, Media Gateway Control Protocol (MGCP), H.323, Session Initiation Protocol (SIP) and the like). An emerging switching platform useful in resolving such network interoperability issues is so-called "software switching". Software switches (also known in the art as "softswitches") are a multi-protocol software solution for signaling and transport thereby providing interoperability across heterogeneous networks,-e.g-., circuit-and packet networks. As such, PSTN and Internet Telephony Service Providers can provide seamless interoperability between PSTN and IP network domains. Of course, the issue raised above with regard to network safety and the introduction of new service features through the implementation of software switches in next generation networks, remains unchanged.

More particularly, there are two main safety properties that are critical in next generation networks, namely, so-called "computational" safety and "network" safety. Computational safety is directed to ensuring that the introduction of a particular piece of software code will be incapable of corrupting other pieces of currently executing code in the system, e.g., the software switch. Computational safety can be provided through the selection of the programming language for coding the software. For example, Java™ is a popular programming language which enables users to create applications that can be used and executed across the Internet without concerns about platform compatibility or network security. That is, Java is a well-known platform-neutral language meaning that programs developed using Java can execute on a variety of computer systems without the need for any modifications. Such platform independence stems from the use of a special format for compiled Java programs called "bytecodes" which are a set of instructions which look similar to conventional machine code, but are not specific to any one processor. Thus, a Java bytecode can be read and executed by any computer system that has the well-known Java interpreter. Thus, placing the Java program in bytecode form enables the execution of such programs across any platform, operating system, or windowing system so long as the Java interpreter is available. As such, the capability of having a single binary file, i.e., Java bytecode file, executable across multiple platforms is a key attribute which is making Java bytecode, particularly in the form of applets, a common way of executing programs across the World Wide Web (WWW).

As will be appreciated, a byetcode file is typically obtained by compiling a Java file and is a stream of bytes representing a single class in a form suitable for the well-known Java Virtual Machine ("JVM"). The Java Virtual Machine executes bytecodes and provides Java with certain fundamental capabilities such as object creation and garbage collection. Importantly, as a virtual machine based language, Java inherently provides computational safety which ensures that a piece of Java code will be incapable of corrupting some other piece of Java code that is executing in the same (or different) process space.

However, while providing computational safety in the context of next generation networks is important, such networks employ robust call processing systems for which computational safety alone is insufficient to ensure the integrity of the network. That is, even though a particular piece of software code, e.g., a service feature, does not corrupt another piece of software code in the network, the particular piece of code can still significantly disrupt the network, e.g., by sending arbitrary messages through the network which, in turn, use network resources arbitrarily. So-called network safety is the safety property that ensures that no single application can arbitrarily misuse network resources thereby damaging the network or decreasing network efficiency. Further, and particular to call processing systems, network safety also means that any damage caused by a specific feature is localized to the that particular feature, e.g., a call, and the balance of the features in the call processing system function normally. Therefore, a need exists for providing network safety in next generation networks

SUMMARY OF THE INVENTION

An aspect of the present invention is directed to a method and apparatus for protecting against network damage in next generation call processing systems. More particularly, in accordance with an aspect of the invention, network safety is achieved using semantic restriction of higher level call processing protocol primitives coupled with dynamically programming the various network routing elements to enforce both so-called connection control and rate control. In accordance with the preferred embodiment of the invention, such semantic restriction restricts the nature of the messages that can be exchanged between the various components of a softswitch. Further, connection control limits the number of connections between various components of the softswitch, and rate control establishes the rate at which such connections are made. In accordance with an embodiment of the invention, such connection control and rate control is achieved by dynamically re-programming various network routing elements. For example, in accordance with an aspect of the invention, connection control is used to restrict the number of connections, e.g., TCP connections, that a particular feature is allowed to make, and rate control is used to restrict the number of messages, i.e., the effective bandwidth, from the particular feature.

In accordance with the preferred embodiment of the invention, a distributed architecture is defined that employs a collection of resources each of which exposes a hierarchical namespace. More particularly, the distributed architecture of the preferred embodiment is that of the so-called "Lucent Technologies Softswitch" (hereinafter referred to as the "LT Softswitch") available from Lucent Technologies Inc. The architecture of the preferred embodiment is directed to providing telephony services in next generation networks and includes two fundamental resource types, namely, i) the device server and ii) the call coordinator, which are interconnected by a network employing a common protocol, e.g., transmission control protocol/Internet protocol (TCP/IP). Each resource can participate in more than one call, i.e., each resource acts as a distributed file system that can arbitrate various requests presented to it. The interaction between the various resources that are available, which are substantially independent, follows conventional "client-server" architecture principles to implement end-to-end communication.

In accordance with the principles of the invention, network safety is provided by applying-the-semantic restriction by isolating and restricting the particular protocol employed by a so-called call processing complex and the particular feature, e.g., a feature applet. In addition, the direct communications of the feature are restricted to the call processing complex which, in accordance with the preferred embodiment, includes, inter alia., at least one softswitch. For example, arbitrary components of the call control complex are not allowed to communicate between each other. Thus, device servers are only allowed to respond to call coordinators, and, more particularly, only to those call coordinators which such device servers have been provisioned. Furthermore, in accordance with the preferred embodiment of the invention, the restrictions are dynamically programmed via an external entity, namely, a so-called "policy server", The policy server monitors all management events in the call processing complex and maintains control over all its elements. As such, the policy server monitors the operational status of the complex's components and maintains configuration information regarding such components thereby making the policy server a strategic entity in facilitating the deliver of network safety in accordance with the principles of the invention.

Advantageously, in accordance with the aspects of the invention, protecting against network damage in next generation call processing systems is realized through using semantic restriction of higher level call processing protocol primitives coupled with dynamically programming the various network routing elements to enforce both connection control and rate control. dr

BRIEF DESCRIPTION OF THE DRAWINGS

Throughout this disclosure, unless otherwise noted, like elements, blocks, components or sections in the figures are denoted by the same reference designations.

DETAILED DESCRIPTION

Figure 1:
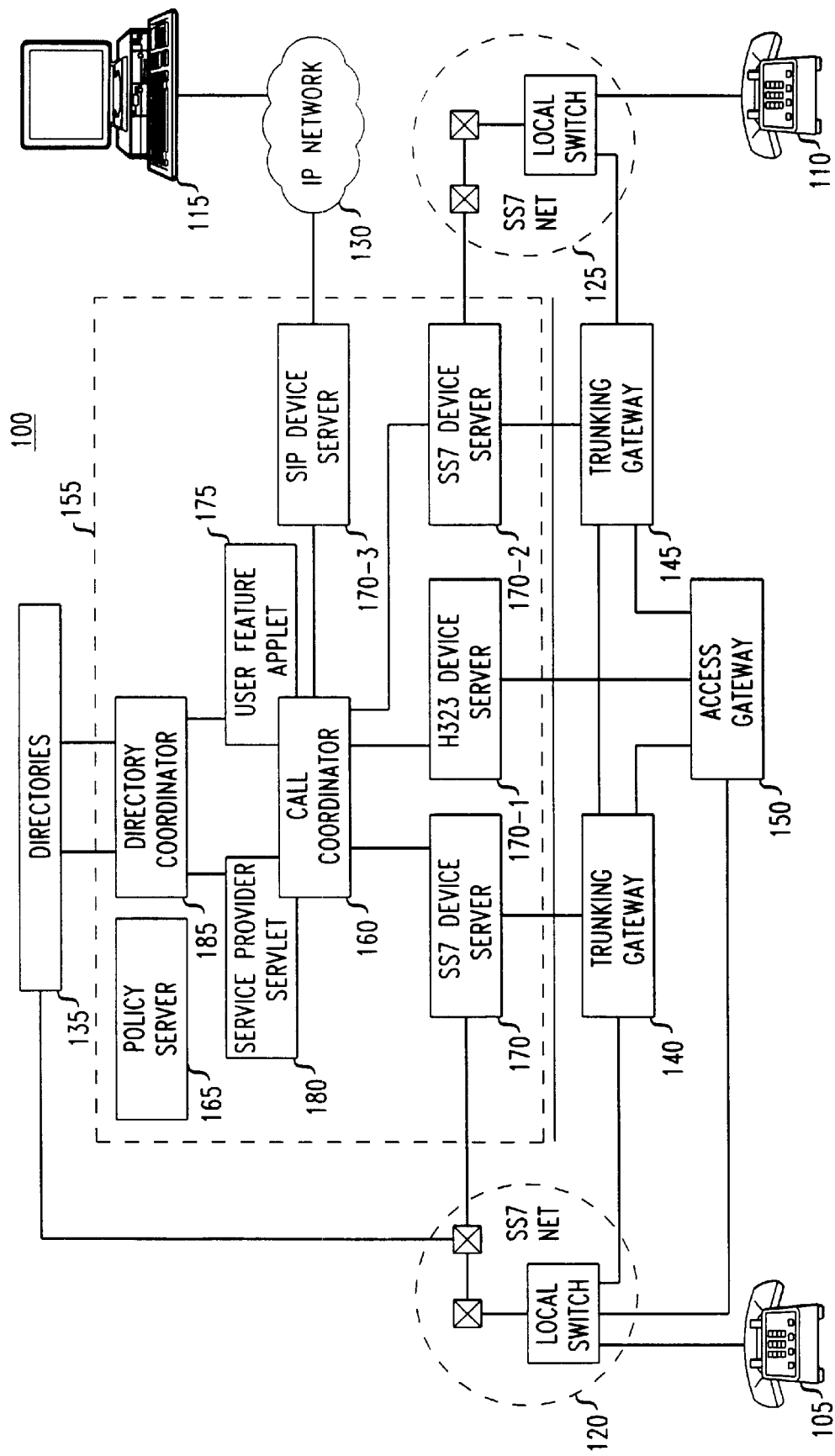
FIG. 1 shows an exemplary architecture for a PSTN/IP network implementing network safety in accordance with the principles of the invention.

The following description will detail and illustrate the various aspects of the invention using an exemplary telephony service example. It will be understood, however, that the invention is not limited for use with any particular system configuration. The principles of the invention are instead more generally applicable to any communications network where the delivery of network safety properties is critical.

In accordance with the preferred embodiment of the invention, seamless telephony can be provided across the various islands of telephony functionality by supplying telephone service using a distributed architecture that employs a collection of resources each of which exposes a hierarchical namespace to at least one other resource. As used herein, a hierarchical namespace is analogous to a computer disk-based hierarchical file system, which may be represented as a tree structure, except that what appears in the nodes and leaves of the hierarchy may not be actual directories and files but instead may be other data structures in memory which are presented in the form of a file system. Thus, a hierarchical namespace is comparable to a so-called "RAM-disk", except that the namespace can be bound to a disk file system. A more detailed description of such a distributed call system is contained in a co-pending, commonly assigned, U.S. patent application Ser. No. 09/092, 495, entitled "Distributed Call System", filed on Jun. 5, 1998, which is hereby incorporated herein by reference for all purposes.

In order to provide context and facilitate a complete understanding of the instant invention, certain features of the above-reference distributed call system will be discussed in the context of the preferred embodiment of the invention. The architecture of the preferred embodiment includes two fundamental resource types, namely, i) the device server and ii) the call coordinator, which are interconnected by a network employing a common protocol, e.g., TCP/IP. Each resource can participate in more than one call, i.e., each resource acts as a distributed file system that can arbitrate various requests presented to it. The interaction between the various resources that are available, which are substantially independent, follows conventional "client-server" architecture principles to implement end-to-end communication. As such, by using the hierarchical namespace, all communications among the resources of the distributed architecture appear to be file system communications.

More specifically, in the term "device server", "server" is used in the conventional manner of the "client-server" architecture, where the server operates on requests from clients and does not take action unless it is in response to a client request. The device server maintains protocol state information for the protocol that it uses to communicate with the call coordinator. Each device server exposes itself as a hierarchical namespace so that any client that wants to make use of the services provided by the device server, accesses the device server as if it is accessing a distributed file system. Typical device servers represent physical/logical telephone devices, which include a) end-point device servers and b) gateway device servers.

End-point device servers 1) represent controls for communication, such as keypads, indicator lamps, and displays, and 2) perform media rendering, e.g., voice digitization, transport, and reconstruction. End-point device servers may include phone device servers; an autoattendant (e.g., voice messaging) server; servers for intelligent personal communications, so-called intelligent agents; and the like. One example of an end-point device server is a phone device server. A phone device server typically models a telephone set which consists of a) a control surface which is employed by a user for call initiation, termination, and control operations, and b) a media rendering engine, e.g., a speaker and/or microphone for audio applications, a display screen for video applications, and the like.

The actual control surface and media rendering details may be different for various particular embodiments, i.e., for different telephone sets or communication devices. For example, a standard plain old telephone service (POTS) telephone set has no display and many aspects of its control surface are actually implemented using the media of the POTS telephone set itself for in-band signaling. By contrast, a so-called personal computer (PC) soft phone uses menus/windows as control surface, with audio rendering done through the PC's sound card. Another type of phone device is a PC running a standard H.323 client. A proxy for the H.323 client runs for such a phone device, typically in the common protocol network, and exposes a namespace interface, e.g., a file system interface. All of these, and other, phone devices may be connected to appropriate phone device servers.

Note that standard telephony concepts such as dial tone, ringing, and the like are details local to the particular phone device. Thus, a phone device server that supports a POTS telephone would likely supply dial tone, whereas the PC user interface may have no direct analogue of a dial tone, and hence the phone device server supporting a PC phone would not provide it. The important notion is that any other client, such as the call coordinator, using a phone device server is unaware of the individual/local details of the end-point device.

For a POTS telephone set a phone device server may be implemented in the form of a PC with a POTS interface card for connection to a POTS telephone set and a network card for TCP/IP connectivity. When used with TCP/IP, the network card may be any type of communications device that can be used to obtain TCP/IP connectivity, such as network interface cards (NIC), conventional analog modems, optical fiber interface cards, integrated services digital network (ISDN) modems, any form of digital subscriber loop (DSL) technology, or the like. The phone device server may be implemented in the form of a subscriber loop carrier or private branch exchange (PBX) that have been outfitted with an interface, such as a TCP/IP interface card, for connecting to the network used by the call coordinator and other device servers.

Gateway device servers have two so-called "sides", One side is implemented to appear to a call coordinator as if it were a device server, and is for connecting the gateway device server to the network used by the call coordinator and other device servers. The other side of the gateway device server has an interface adapted to interface with, as well as control and operate, elements of a preexisting island of telephone service. An exemplary gateway device server is a line device server. Illustratively, a line device server typically models a legacy network interface which is capable of supporting one or more telephone calls through a preexisting island of telephone service, such as the well-known PSTN.

A primary function of a gateway device server is to act as a gateway between the network connecting the device servers and call coordinators and some other external network, e.g., a network which is one of the islands of telephony. To this end, the gateway device server is a valid entity in the network and employs the appropriate protocol of that network. By exposing a namespace to its clients, namely, the call coordinator, individual gateway device servers shield the call coordinator from specific signaling protocols of the network. This is achieved by maintaining protocol specific state in the gateway device server. Device servers can handle multiple calls from a single call coordinator, as well as handle multiple such call coordinators. To handle such multiple interactions and multiplexing, device servers maintain a local state.

A call coordinator accomplishes communications among various device servers. The call coordinator may be implemented as a software module that is executed by a computer connected to the network to which the device servers are attached. The computer executing the call coordinator may be separate from the computer, or computers, of the device servers, or it may share processing power with one or more of the device server computers, or other computers attached to the network. Alternatively, the functionality of the call coordinator may be distributed over several computers, which may be separate from, or shared with, the computers of the device servers, in any combination. Furthermore, a single network may have more than one call coordinator attached to it.

A call/communication, and any associated management tasks, is entirely handled by the call coordinator. The call coordinator functions in the role of the "client" of the conventional "client-server" architecture, e.g., it initiates requests for services to the various device servers. Typically, such requests are in response to a so-called "event" that is detected by the call coordinator. Since the call coordinator is the client, it is able to request service from various ones of the servers, i.e., device servers or gateway servers, as is appropriate for the service being provided on a particular call and consistent with stored rules or registrations.

The device servers are unaware of communication state, which is the interaction among multiple device servers. Instead, communication state is maintained by the call coordinator, which exposes the communication state as a hierarchical namespace. As a client of the device servers, the call coordinator manipulates the device servers to accomplish communications. The call coordinator furthermore captures and exports such an interaction, known as a "call session", as a hierarchical namespace.

The call coordinator treats the processing of a call as a sequence of steps each of which can be implemented by a small piece of computer executable code called a "feature applet", Feature applets perform a specific step in call processing and typically manipulates the call tree of the namespace exposed by the call coordinator. That is, apart from loading the feature applets, the call coordinator and the feature applets communicate entirely through the call tree. Feature applets can be dynamically loaded and executed by the call coordinator. In accordance with an aspect of the invention, the feature applet code can be located anywhere in the network and can be loaded on the fly from the network or an independent software vendor (ISV), or the feature applet itself can be executed somewhere else in the network. Since the session state is manipulated using the call tree which is exposed by the call coordinator as a hierarchical namespace, the location of the feature applet itself or its execution, as part of processing the current call/session is irrelevant.

Clearly, as is evvident from the discussion above, the ability to provide network interoperability amongst and between heterogeneous communications networks is critical in the delivery of next generation communications networks. The various aspects of the present invention are directed at the delivery such network safety in such communications networks.

More particularly, FIG. 1 shows an exemplary architecture for PSTN/IP communications network 100 implementing network safety in accordance with the principles of the invention. As shown, exemplary architecture 100 includes: POTS telephones 105 and 110, IP phone 115, SS7 networks 120 and 125 (forming part of the PSTN), IP network 130, trunking gateways 140 and 145, access gateway 150, directories 135, and call processing complex 155. In accordance with the preferred embodiment, call processing complex includes a softswitch and, in particular, the aforementioned LT Softswitch available from Lucent Technologies Inc., 600 Mountain Ave., Murray Hill, N.J. 07974.

As shown in FIG. 1, call processing complex 155 comprises: call coordinator 160, device servers 170, 170-1, 170-2, and 170-3, respectively, user feature applet 175, service provider servlet 180, directory coordinator 185, and policy server 165. Call coordinator 160 is an object, as discussed above, that manages the overall flow of events involved in one or more communications sessions, e.g., call processing sessions, and maintains information for each call that it is managing. Illustratively, the information maintained by call coordinator 160 includes call-specific items such as: user feature applet(s), a service provider servlet, and device server(s), as utilized in the call processing request. As is discussed in more detail below, the information maintained by call coordinator 160 is represented as a common namespace so that any interested entity in the system can access the information.

The device servers, i.e., device servers 170, 170-1, 170-2, and 170-3, respectively, in call processing complex 155 allow communications between various network elements using different protocols. For example, device server 170 is illustratively shown as an SS7 device server for facilitating communications in the well-known SS7 signaling protocol via a circuit switched network, e.g., SS7 network 120 and trunking gateway 140. Similarly, device server 170-3 is illustratively shown as an SIP device server for facilitating communications in the well-known SIP signaling protocol via a packet network, e.g., IP network 130. Advantageously, call processing complex 155 utilizes one or more device servers for each different protocol/gateway configuration for which communications are desired. Further, communication to and from such gateways is encapsulated entirely within call processing complex 155 thereby eliminating the need for other components within the communications system to be aware of the protocol being used. As such, the delivery of new gateways to the communications system, e.g., exemplary architecture 100, is accomplished simply by adding an appropriate device server for that gateway type without impacting any other part of call processing complex 155.

Figure 2:
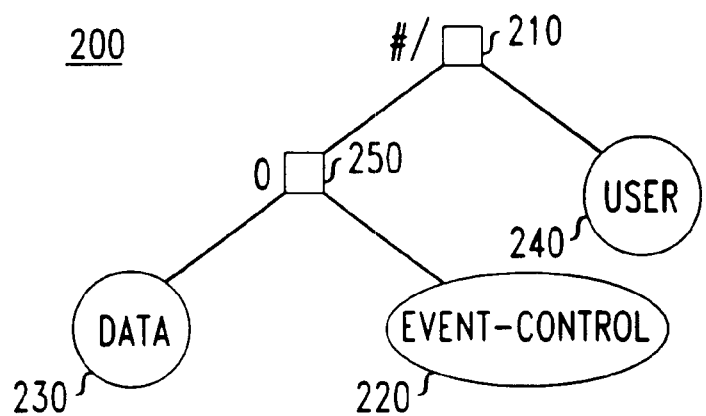
FIG. 2 shows an illustrative namespace tree for a device server, e.g., as shown in FIG. 1.

FIG. 2 shows illustrative namespace tree 200 for a device server. As is conventional in file systems, root node 210 of namespace tree 200 is designated "#/". Event-control 220 is the file into which events that are to be indicated to the call coordinator are written, and into which service requests from call coordinator are written. Thus, an indicator that a call is to be originated and the dialed digits are placed in event-control 220. Node data 230 is used for negotiation of media once a call is set up. Node user 240 contains indications as to which feature applets are to be run by call coordinator in processing a call for the device server, as described in more detail hereinbelow.

Figure 3:
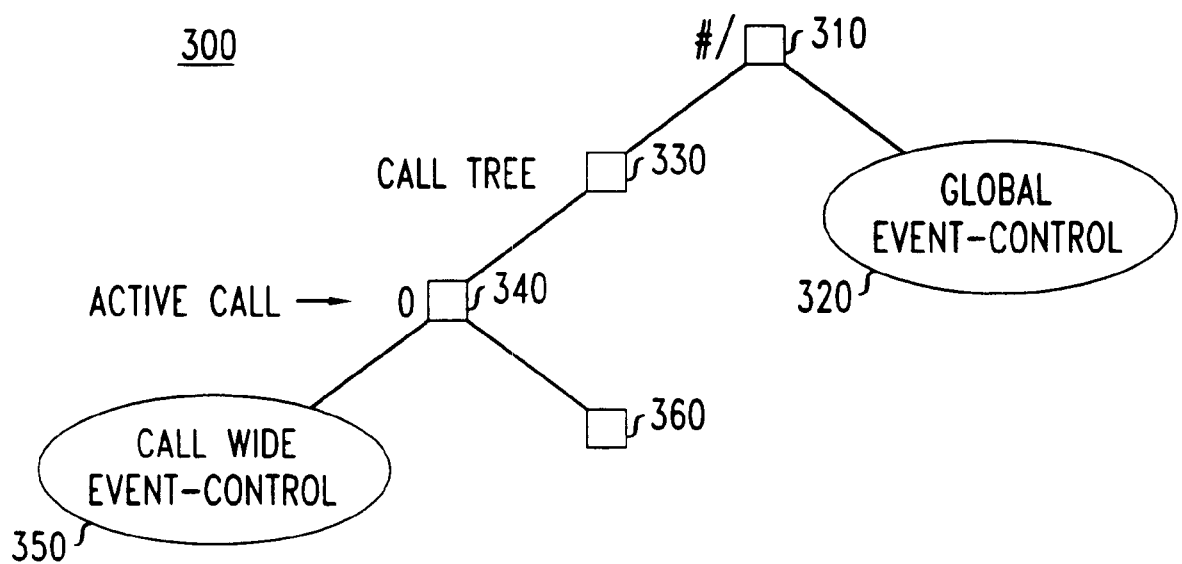
FIG. 3 shows an exemplary namespace of a call coordinator, e.g., as shown in FIG. 1.

Further, FIG. 3 shows an exemplary namespace 300 of a call coordinator. As for namespace 300, root node 310 of the namespace is "#/". Under root node 310 is global event-control file 320. Global event-control file 320 holds all events that pertain to all of the calls, e.g., globally related billing information, such as a change of billing rate schedule because of a change of time. Additionally, global event-control file 320 can be opened and read by programs, such as event detail recording, that desire to learn about all the call processing events that are taking place in a particular call coordinator.

Calltree node 330, also under root node 310, contains all the calls currently active under the jurisdiction of the active call coordinator, e.g., call coordinator 160. Thus, for each active call there is an active call node 340. In FIG. 3, for clarity of discussion, only one active call is shown but it will be noted that multiple call coordinators and active calls may exists in accordance with the principles of the invention. Under each active call node 340 there is a call-wide event control file 350 and a number node 360 for each device on the call. Call-wide event control file 350 is used for events that pertain to the call as a whole. Call-wide event control file 350 provides all the call processing events relevant to this particular call. The call coordinator and the feature applets may communicate through call-wide event control file 350. Each number node 360 is identified by the network routable address of the device that it represents. The number node actually represents the entire namespace exposed by the identified device. Thus, the number node is not actually a single node but instead is itself a tree of the namespace of a device server, with the root node of the tree being located in the location of number node 360.

Turning our attention back to FIG. 1, user feature applet 175 is an object that represents a participant in a call, i.e., execution of user feature applet 175 implements the requisite service logic associated with that session participant. For example, user feature applet 175 will deliver feature applets/services as requested by the caller such as the wellknown call waiting service. Advantageously, this allows service providers and/or third party service vendors to create services and offer them through a particular service provider's suite of services. As such, service provider servlet 180 is an object utilized by the service provider to customize their service offerings. For example, utilizing service provider servlet 180, the service provider may customize the behavior of call processing complex 155 to route traffic through different telecommunications carriers during different times of the day to take advantage of lower toll rates.

Still further, directory coordinator 185 communicates with directories 135 which are required for certain service offerings via both PSTN and IP networks. For example, directories 135 might include well-known Service Control Point (SCP) databases, or Lightweight Directory Access Protocol-based databases, or SIP active directories. As such, by incorporating directory coordinator 185 directly into call processing complex 155, other components in the system are relieved of having to interface with directories 135 for the information required to deliver a specific feature.

In accordance with an aspect of the invention, network safety is achieved using semantic restriction of higher level call processing protocol primitives coupled with dynamically programming the various network routing elements to enforce both connection control and rate control. In accordance with the principles of the invention, network safety is provided by applying the semantic restriction by isolating the particular protocol employed by call processing complex 155 and the particular feature, e.g., user feature applet 175. In addition, the direct communications of the feature are restricted to call processing complex 155. Furthermore, in accordance with the preferred embodiment of the invention, the restrictions are dynamically programmed via policy server 165. Policy server 165 monitors all management events in call processing complex 155, and maintains control over all its elements. As such, the policy server monitors the health of the softswitch's components and maintains configuration information regarding such components thereby making policy server 165 a strategic entity in facilitating the deliver of network safety in accordance with the principles of the invention. It will be further understood that while the policy server is shown as part of the call processing complex in the embodiment of the invention as shown in FIG. 1, the policy server may also be implemented separately and external to the call processing complex in accordance with the principles of the invention.

Advantageously, in accordance with an aspect of the invention, protecting against network damage in next generation call processing systems is realized through using semantic restriction of higher level call processing protocol primitives coupled with dynamically programming the various network routing elements to enforce both connection control and rate control, as will be readily understood from the following illustrative sequence of fucntions which occur during an exemplary communications session wherein a telephone call is extended between POTS telephone 105 and IP phone 115.

Illustratively, POTS telephone 105 is connected in a conventional manner to SS7 network 120 and via a POTS interface to SS7 device server 170. SS7 device server 170, call coordinator 160 and SIP device server 170-3 are connected by data links and to IP network 130, which is, for example, an Internet-like network or a so-called intranet. As such, SIP device server 170-3 is connected, via IP network 130, to IP phone 115, e.g., by a conventional TCP connection. To achieve a telephone call between POTS telephone 105 and IP phone 115, the following exemplary functions occur.

When the telephone call is originated by POTS telephone 105, POTS telephone 105 is taken offhook, e.g., by a calling party, in the usual manner. This sends a signal to SS7 device server 170, which supplies, or causes the supplying of, dial tone, to POTS telephone 105. In response to dialing taking place at POTS telephone 105, SS7 device server 170, removes, or causes the removal of, the dial tone and obtains the dialed digits. Thereafter, SS7 device server 170 raises an event, which may be achieved by writing to the event-control file of the tree representing the hierarchical namespace of SS7 device server 170. As previously noted, the hierarchical namespace of device server 170 may be represented as a tree data structure.

Thereafter, the active call coordinator, e.g., call coordinator 160, examines the event-control files of the namespace trees of all the device servers that it supports. To this end, call coordinator 160 is aware of the configuration or topology of IP network 130, including the location, e.g., the addresses of, the device servers as well as the particular devices behind those servers. Thus, for example, call coordinator 160 may have stored the identities of the owners of telephones served by phone device servers, the telephone numbers, if any, of such telephones, and the lines served directly, or the telephones reachable, by line device servers. The information necessary to provide call coordinator 160 with this awareness may be preprogrammed into call coordinator 160, may be dynamically discovered by call coordinator 160 using know processes, or may be achieved using a combination of the foregoing.

In response to reading the event-control file as described previously, call coordinator 160 undertakes to determine what event has taken place and what action, if any, is required. In the particular example described above, call coordinator 160 determines that a user at POTS telephone 105 desires to make a call to the telephone number indicated by the dialed digits. To achieve this in the manner desired by the caller, call coordinator 160 causes the necessary applets, e.g., user feature applet 175, to execute.

In accordance with embodiments of the invention, of the particular applets executed for establishing a call may be: a single applet custom for the calling party; a generic applet for the calling party; a sequence of applets that are custom to the calling party; a generic sequence of applets for the calling party; a single applet custom for the called party; a generic applet for the called party; a sequence of applets that are custom to the called party; a generic sequence of applets for the called party; any combination of the foregoing; and/or other applets that may be written, e.g., by ISV's, for such applications. The applets may all be located within call coordinator 160, external to call coordinator 160 (e.g., within call processing complex 155), or a combination of both. Also, the applets may all be executed by call coordinator 160 or may be executed by other resources, e.g., servers or call coordinators, connected to IP network 130 and/or SS7 networks 120 and 125, respectively.

For example, the caller may have specified a feature that permits the caller to identify a multiple telephone number sequence to contact specified called parties as a function of the telephone number dialed. If so, call coordinator 160 executes the applet for this feature, which would determine if the dialed number was associated with a multiple telephone number sequence. In the event that the dialed telephone number was not associated with a multiple telephone number sequence, call coordinator 160 executes the default call placement applet. In the event that the dialed telephone number was associated with a multiple telephone number sequence, call coordinator 160 obtains the first telephone number of the sequence and executes the default call placement applet. If the call was not completed, control is returned to the sequence applet, which obtains the next number, if any, and again executes the default call placement applet. If a call could not be completed to any of the telephone numbers in the sequence, the sequence applet transfers control back to call coordinator 160, which executes another applet, e.g., play a message to inform the calling party that the called party could not be reached.

Assuming that a IP voice connection is desired to be attempted for a single telephone number, call coordinator 160 determines, for IP network 130, the network routable address of the called party that corresponds to the obtained digits. This is performed by a mapper within, or associated with, call coordinator 160. The mapper is, essentially, a routing engine. The function of the mapper is to supply to an applet, e.g., the currently executing applet, a restricted list of addresses for gateway device servers or phone device servers which are likely to be able to complete the call.

In the present illustrative embodiment where an IP connection is desired, the mapper returns the address of SIP device server 170-3. Call coordinator 160 requests, as a client, service from SIP device server 170-3. In particular, call coordinator 160 requests that SIP device server 170-3 establish a connection to the telephone number obtained from POTS telephone 105. This is achieved by writing an appropriate command, e.g., an establish connection command, into the event-control file of the namespace tree of SIP device server 170-3.

In response to the request for service from call coordinator 160, e.g., via its conventional TCP/IP interface, SIP device server 170-3 begins the process of establishing the requested connection from itself to IP network 130 and, ultimately, to IP phone 115. This is accomplished by using conventionally available protocols of SS7 network 120 and IP network 130, and, in accordance with an aspect of the invention, is completely transparent to call coordinator 160. Upon achieving a connection to IP phone 115, call coordinator 160 causes the establishment of a media path between SS7 device server 170 and SIP device server 170-3. This is achieved by call coordinator 160 through the writing of service requests for media connectivity into the event-control file of the namespace tree of each of SS7 device server 170 and SIP device server 170-3, respectively.

Upon successful connection and establishment of the call, call coordinator 160 monitors the call in the event further service is required on the call. For example, call takedown may be requested in response to one of the communications devices going "on-hook", Alternatively, additional feature processing, such as call waiting, call transfer, or bill sharing, may be requested. As with call setup, the need to provide such service is indicated by requests placed into the event-control file of the namespace tree of the relevant one of SS7 device server 170 and/or SIP device server 170-3. Call coordinator 160 reads the event-control file, runs the appropriate applets, and, as client, issues service requests to the appropriate device servers. To terminate the call, for example, POTS telephone 105 goes on-hook. This event is written into the event-control file of the narnespace tree of SS7 device server 170, and call coordinator 160 becomes aware of the event. In response to the event, an applet is run by call coordinator 160. In one embodiment of the invention, the applet may request disconnect service from SS7 device server 170 and SIP device server 170-3, by writing a disconnect command into each of their event-control files, along with specifying the respective telephone number to be disconnected.

Similarly, if IP phone 115 terminates the call, an indication of this event is written into the event-control file of the namespace tree of SIP device server 170-3. Upon detection of this event in the event-control file of SIP device server 170-3, call coordinator 160 executes the associated applet. In a further embodiment of the invention, the applet may request disconnect service from SS7 device server 170 and SIP device server 170-3, by writing a disconnect command into each of their event-control files, along with specifying the telephone number to be disconnected.

As one can appreciate from the description of the preferred embodiment above, the delivery of the exemplary telephony service involves the execution of several processes or threads, e.g., the call coordinators, the device servers, and the feature applets, and the use of multiple protocols through heterogeneous networks. Further as detailed above, the preferred embodiment is executed using systems employing virtual machines, e.g., the Java Virtual Machine. As such, the delivery of network safety is crucial to ensure that no single application can arbitrarily misuse network resources thereby damaging the network or decreasing network efficiency. Further, and particular to call processing systems, the delivery of network safety will ensure that any damage caused by a specific feature is localized to the that particular feature, e.g., a call, and the balance of the features in the call processing system function normally.

As mentioned previously, in accordance with the principles of the invention, network safety is achieved using semantic restriction of higher level call processing protocol primitives coupled with dynamically programming the various network routing elements to enforce both connection and rate control. Illustratively, such semantic restriction restricts the nature of the messages that can be exchanged between the various components of a softswitch. Ftuther, connection control limits the number of connections between various components of the softswitch, and rate control establishes the rate at which such connections are made. In accordance with an embodiment of the invention, such connection control and rate control is achieved by dynamically re-programming various network routing elements. In accordance with the principles of the invention, network safety is provided by applying the semantic restriction by isolating the particular protocol employed by the call processing complex, e.g., call processing complex 155, and the particular feature, e.g., user feature applet 175. In addition, the direct communications of the feature are restricted to call processing complex 155. Furthermore, in accordance with the preferred embodiment of the invention, the restrictions are dynamically programmed via policy server 165. Policy server 165 monitors all management events in the call processing complex 155, and maintains control over all its elements. As such, the policy server monitors the health of the softswitch's components and maintains configuration information regarding such components thereby making the policy server a strategic entity in facilitating the deliver of network safety in accordance with the principles of the invention.

Figure 4:
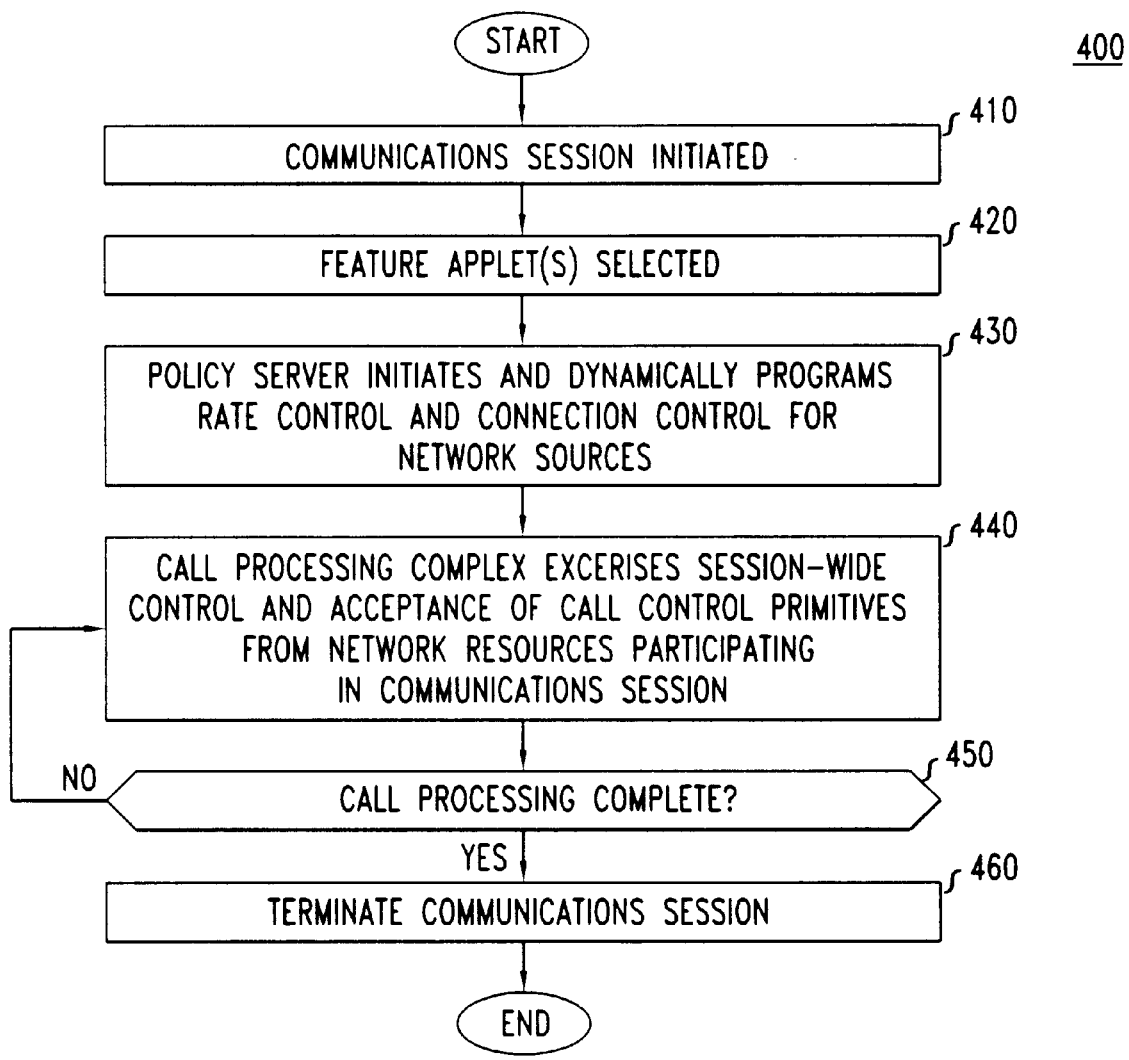
FIG. 4 is a flowchart of illustrative operations 400 delivering network safety in communications networks in accordance with the principles of the invention.

In particular, FIG. 4 is a flowchart of illustrative operations 400 for delivering network safety in communications networks in accordance with the principles of the invention. More particularly, a communications session, e.g., a call processing request, is initiated (block 410). The appropriate feature applet(s) are selected (block 420) for the particular communications session. In accordance with various embodiments of the invention, the feature applets may be selected or supplied: (i) directly within the call processing complex, (ii) directly from the softswitch, (iii) from a user; (iv) from a independent software vendor (ISV); (v) from the service provider; or (vi) any combination of the foregoing. As a finction of the selected feature applets and communications session, in accordance with an aspect of the invention, the policy server (see, e.g., FIG. 1, policy server 165) initiates and dynamically programs (block 430) certain rate control and connection control features into select entities of the network.

More particularly, the policy server determines where the feature applet is stored and determines the path from the stored feature applet to the call control complex, i.e., the softswitch. Thereafter, the policy server determines the network elements along the aforementioned path. In particular, in accordance with the preferred embodiment of the invention, the network elements in the softswitch-controlled network will register with a directory server thereby facilitating the delivery of a so-called directory enabled network. In such a directory-enabled network, the policy server can interrogate the directory server to ascertain which of the registered network elements are along the relevant path in the network, and the various registered properties and characteristics of such network elements. In accordance with the preferred embodiment, such network elements are re-programmed by initiating and implementing a new rate control and connection control policy.

In particular, such a rate control and connection control policy specifies, illustratively, the type of network entities that can be contacted by a feature applet, and the number of messages per time period that will be allowed for any particular communication. Thus, a given policy, in accordance with the preferred embodiment, is implemented by transmitting, in a well-known communication protocol, the policy to the network elements in the identified path. Further, special code fragments, so-called Policy Enforcement Points (PEP) receive such transmissions. PEP's are well-known software fragments that have two so-called "sides", One PEP fragment side accepts transmitted policies in a well-known communications protocol. The other PEP fragment side sends control signals to specific devices in its purview.

For example, an illustrative PEP for a well-known Packet Voice Gateway (PVG) or router will receive policies from the policy server, translate the policies into a sequence of commands that are specific to the requisite devices, and transmit such commands to the devices. As will be appreciated, the transmission of such commands can be achieved in a variety of manners: (a) the PEP may execute on the device itself such that the transmission can take the form of inter-process communication (IPC); or (b) the PEP may execute on a host machine on the network and send the command sequences via command protocol, e.g., the well-known Simple Network Management Protocol (SNMP), which is supported by the device, i.e., network element; or (c) the PEP can execute on a particular host machine on the network, open a remote login session on the network element, and employ the well-known Comniand Line Interface (CLI) to send command sequences to the network element.

While the aforementioned discussion focused on communications between the policy server and the PEPs, and between the PEPs and the network elements that were essentially "one-way", i.e., from the policy server to the PEPs and from the PEPs to the network elements, it will be understood that information may flow in other manners. That is, in accordance with further embodiments of the invention, communications may flow from the network element to the PEP and the policy server. Such information is characterized as an "event", Thus, a network element may generate one or more events which are exposed to a PEP. Illustratively, the PEP may monitor a network element for such events, or periodically read certain information stored and updated by the device, or receive such events from the network element using a well-known protocol. As such, the PEP, in turn, exposes these events to the policy server wherein such events may trigger one or more actions. These actions may result in the transmission of one or more policies to the PEPs requesting a re-programming of the network elements, in accordance with the preferred embodiment of the invention. Thus, events generated at a network element may result in the network element being re-programmed according to a new policy thereby altering the element's behavior.

For example, if two events A and B, respectively, are generated at network elements 1 and 2, respectively, and exposed to the policy server. The policy server, in accordance with the preferred embodiment, shall correlate the two events and issue new policies to re-program the network elements. The correlation supported by the policy serve will include (a) conjunction of one or more events; (b) disjunction of one or more events; (c) sequences of events with repetition; (d) sequences of events containing so-called "wild cards" and certain specific events; or (e) the absence of one or more events. Thus, event expressions, in accordance with the preferred embodiment, conjoining (a) through (e), as listed above, in any logical order are allowed. Thus, as will be appreciated, an extremely complex set of events can be captured or described by such event expressions which can be used to identify a diverse set of conditions occurring at various network elements. Therefore, the policy server, in accordance with the principles of the invention, is positioned to understand the various conditions and take corrective or pre-emptive action(s) by transmitting specific new policies to select network elements.

For example, as discussed in the embodiment below, the policy server will program a firewall in certain networks, e.g., SS7 network 120 of FIG. 1, to ensure that rate controlled access to this network is implemented. As is well-known firewalls are used to deliver a variety of security measures to protect networks from external security breaches such as the introduction of computer viruses. This security scheme essentially places a separate computer system, i.e., the firewall, between the private network and the public network, e.g., the Internet. These firewalls are software-based gateways that are typically installed to protect computers on a local area network (LAN) from attacks by outsiders, i.e., unauthorized users. The firewall maintains control over communications from and to the private network. Essentially, the firewall imposes certain security measures on all users employing the private network. For example, firewalls may block access to new Internet services or sites on the World Wide Web (WWW) because the security consequences are unknown or not accounted for by the present firewall configuration.

Thus, in accordance with the principles of the invention, the policy server will program the relevant firewalls to ensure, inter alia., that ISV's have rate controlled access to the host entity, e.g., a server, hosting the feature applet, or that a feature applet hosted in a network (e.g., SS7 network) has rate controlled access to a predetermined set of network resources, or that a hosted applet has access to the call coordinator. After the dynamic programming of the rate control and connection control by the policy server, in accordance with the invention as detailed above, call processing complex 155 exercises session-wide access control and accepts call control primitives from all network resources participating in the call processing request (see, FIG. 4, block 440). In accordance with the preferred embodiment, the session-wide control exercised by the softswitch continues until call processing is complete (see, FIG. 4, block 450) and, upon call completion, the communications session is terminated (see, FIG. 4, block 460).

Figure 5:
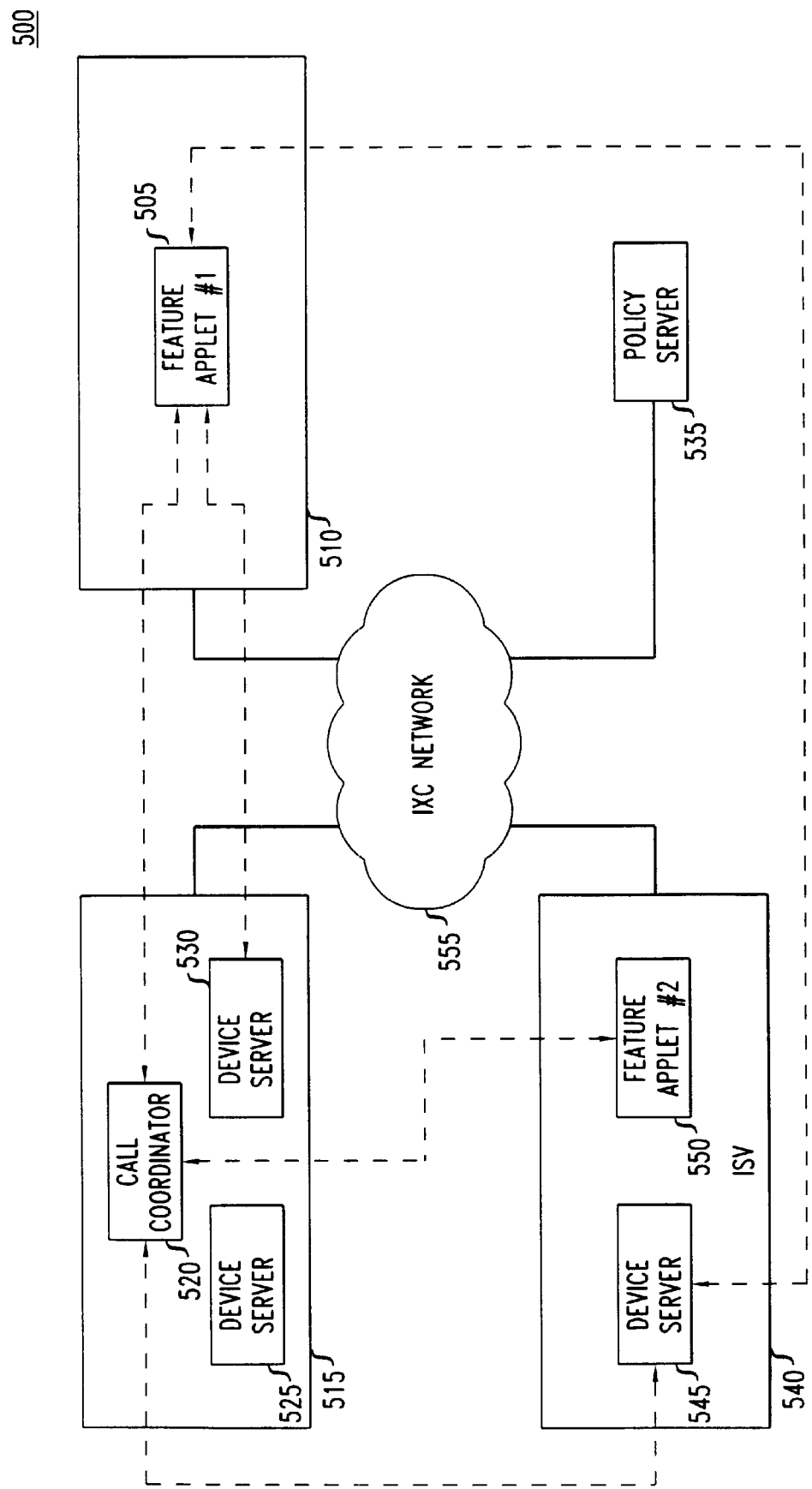
FIG. 5 shows an exemplary network management scenario having network safety features delivered in accordance with the principles of the invention.

To further illustrate the above-described details and principles of the invention, FIG. 5 shows an exemplary network management scenario 500 having network safety features as delivered in accordance with the principles of the invention. Exemplary scenario 500 begins with feature applet 505 as hosted on host server 510 attempting to connect with device server 530 residing within call processing complex 515. As detailed previously, the hosted applet is utilized in the particular call session and delivers certain call processing features as required by that call session. In accordance with the principles of the invention, feature applet's 505 connection to and with device server 530 is controlled by policy server 535. In accordance with the instant embodiment of the invention, policy server 535 is a separate entity within the communications system. Further, call coordinator 520 controls which events initiated by feature applet 505 are multiplexed to device server 530 and/or device server 525 in order to mitigate any corruption within call coordinator 520 caused by feature applet 505. In addition, as detailed previously, call coordinator 520 exercises session-wide access control and accepts call control primitives from all network resources, e.g., inter-exchange network (IXC) 555, participating in the communications session.

In accordance with exemplary scenario 500, feature applet 505 may also attempt to connect with device server 545 resident in ISV 540 with malicious intent, e.g., to instruct the device server to deny service to it's associated device gateway. As detailed above, in accordance with an aspect of the invention, policy server 535 will program a firewall associated with ISV 540 to ensure, inter alia., that ISV 540 has rate controlled access to the host entity (e.g., host server 510) hosting the feature applet, or that the feature applet has rate controlled access to a predetermined set of necessary resources. Further, in accordance with exemplary scenario 500, device server 545 may attempt to connect with call coordinator 520 to direct the desired routing of the call. As before, in accordance with an aspect of the invention, policy server 535 will program a firewall residing in ISV 540, call processing complex 515, and/or IXC network 555 to ensure, inter alia., that rate controlled access and connection control, i.e., network safety, is provided within the communications session. Further, feature applet 550, as required by the particular call processing request in the session, may require access to call coordinator 520. As with feature applet 505, feature applet's 550 connection to and with call coordinator 520 is controlled by policy server 535. Further, call coordinator 520 controls which events initiated by feature applet 550 are multiplexed to device server 530 and/or device server 535 in order to mitigate any corruption within call coordinator 520 caused by the execution of feature applet 550.

Advantageously, in accordance with the invention, protecting against network damage in next generation call processing systems is realized through using semantic restriction of higher level call processing protocol primitives coupled with dynamically programming the various network routing elements to enforce both connection and rate control.

As detailed above, the present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a generalpurpose processor, the program code segments combine with the processor to provide a unique device that operates analogously to specific logic circuits.

Furthermore, all examples and conditional language recited herein are principally intended expressly to be only for pedagogical purposes to aid the reader in understanding the principles of the invention and the concepts contributed by the Applicants to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flowcharts, flow diagrams, state transition diagrams, pseudocode, program code, and the like represent various processes which may be substantially represented in computer readable medium and so executed by a computer, machine, or processor, whether or not such computer, machine, or processor, is explicitly shown.

The foregoing merely illustrates the principles of the present invention. It will thus be appreciated that those skilled in the art will be able to devise various arrangements which, although not explicitly described or shown herein, embody the principles of the invention and are included within its spirit and scope.

We claim:

1. A method for providing services in a communications network comprising:

initiating a communications session in the communications network;

executing, in response to the initiating of the communications session, a first process in a host server to deliver at least one service in the communications network;

executing, in response to the initiating of the communications session, a second process in a device server to deliver the at least one service in the communications network;

executing a third process in a call coordinator for receiving and operating on requests from the device server and the host server in the delivery of the at least one service; and establishing rate control and connection control between the host server, the device server, and the call coordinator.

2. The method of claim 1 wherein the establishing the rate control and the connection control is performed by a policy server.

3. The method of claim 2 wherein the establishing the rate control and the connection control operation further comprises:

dynamically programming at least one firewall in the communications network to restrict access of the first process to a predetermined set of network resources.

4. The method of claim 3 wherein the communications system employs a Java Virtual Machine in executing at least one of the first process, the second process, or the third process.

5. The method of claim 4 wherein the device server and the call coordinator are coupled in a client-server arrangement.

6. The method of claim 5 wherein the device server and at least one of the call coordinators exposes a hierarchical namespace.

7. A method of claim 4 wherein the first process is a feature applet.

8. The method of claim 6 wherein the device server and the call coordinator are coupled together by a SS7 signaling network.

9. The method of claim 3 wherein the policy server further performs the operations of:

monitoring the communications session;

maintaining control over the set of network resources; and monitoring a operational status of the host server, the device server, and the call coordinator.

10. The method of claim 7 wherein the feature applet is downloaded over a connection between the communications network and a independent software vendor server.

11. The method of claim 2 wherein the policy server employs at least one Policy Enforcement Point (PEP) in the establishing of the rate control and the connection control.

12. The method of claim 3 wherein the device server and the call coordinator are part of a softswitch.

13. The method of claim 12 wherein the communications network includes at least one PSTN and at least one IP network.

14. The method of claim 13 wherein the established rate control restricts a traffic bandwidth shared within the communications network.

15. The method of claim 13 where the established connection control restricts a number of communication connections made within the communications network.

16. A communications system comprising:

a host server executing, in response to a initiating of a communications session in the communications system, a first process to deliver at least one service in the communications system;

a device server executing, in response to the initiating of the communications session, a second process to deliver the at least one service in the communications system;

a call coordinator executing a third process for receiving and operating on requests from the device server and the host server in the delivery of the at least one service; and a policy server for establishing rate control and connection control between the host server, the device server, and the call coordinator.

17. The communications system of claim 16 wherein the establishing of the rate control and the connection control is performed by a policy server.

18. The communications system of claim 17 wherein the policy server in establishing the rate control and the connection control dynamically programs at least one firewall in the communications system to restrict access of the first process to a predetermined set of network resources.

19. The communications system of claim 18 wherein the communications system employs a Java Virtual Machine in executing at least one of the first process, the second process, or the third process.

20. The communications system of claim 17 wherein the device server and the call coordinator are coupled in a client-server arrangement.

21. The communications system of claim 20 wherein the device server and at least one of the call coordinators exposes a hierarchical namespace.

22. The communications system of claim 18 wherein the first process is a feature applet.

23. The communications system of claim 20 wherein the device server and the call coordinator are coupled together by a SS7 signaling network.

24. The communications system of claim 16 wherein the policy server monitors the communications session, maintains control over the set of network resources, and monitors a operational status of the host server, the device server, and the call coordinator.

25. The communications system of claim 22 wherein the feature applet is downloaded over a connection between the communications network and a independent software vendor server.

26. The communications system of claim 17 wherein the policy server employs at least one Policy Enforcement Point (PEP) in the establishing of the rate control and the connection control.

27. The communications system of claim 26 wherein the device server and the call coordinator are part of a softswitch.

28. The communications system of claim 27 wherein the communications network includes at least one PSTN and at least one IP network.

29. The communications system of claim 28 wherein the established rate control restricts a traffic bandwidth shared within the communications network.

30. The communications system of claim 28 where the established connection control restricts a number of communication connections made within the communications network.

* * * * *